Oct. 20, 1936.  M. E. NOYES ET AL  2,058,173
VIBRATION DAMPER
Filed March 31, 1933
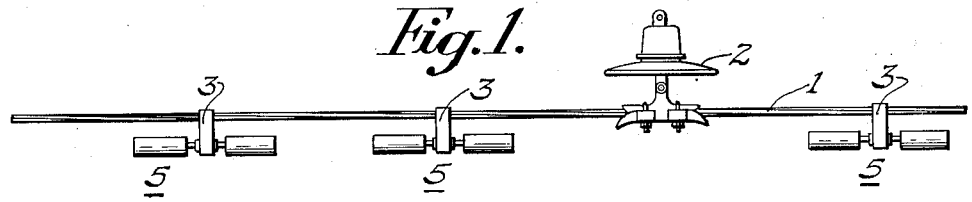
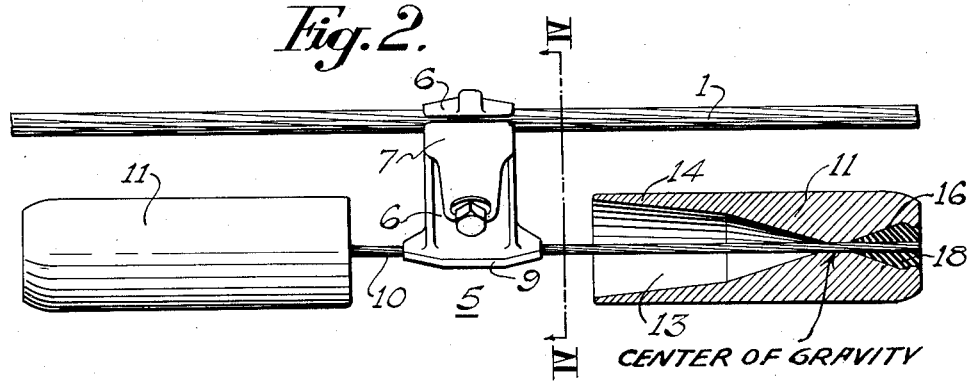
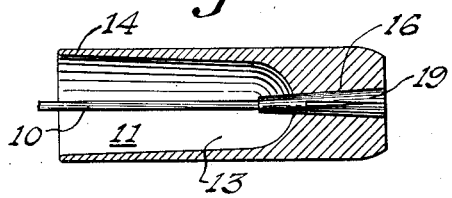
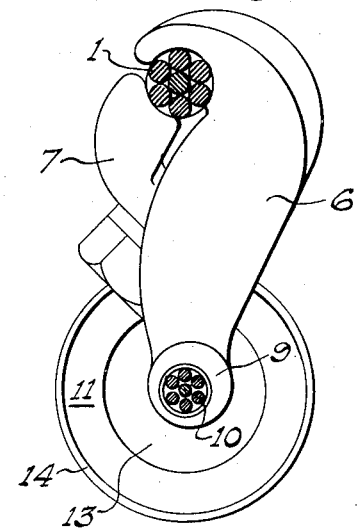
INVENTORS
MAXWELL E. NOYES &
ROBERT A. MONROE
BY
ATTORNEY Patented Oct. 20, 1936

2,058,173

UNITED STATES PATENT OFFICE 2,058,173

VIBRATION DAMPER

Maxwell E. Noyes and Robert A. Monroe, Mount Lebanon, Pa., assignors to Aluminum Company of America, Pittsburgh, Pa., a corporation of Pennsylvania Application March 31, 1933, Serial No. 663,748

8 Claims. (Cl. 173—13)

This invention relates to vibration dampers for preventing or minimizing vibration in suspended wires, cables and the like, such as are used in electrical transmission lines. More particularly it relates to vibration dampers of the type described and illustrated in U. S. Patent No. 1,675,391 to George H. Stockbridge, consisting of weights resiliently suspended from a transmission line.

It has been recognized that any suspended cable or wire conductor, such as is commonly used for the transmission of electrical energy, irrespective of material, span length, tension, size, or character of supports, will vibrate under certain conditions. It has been established that these vibrations are chiefly caused by transverse air currents, and that they exist almost entirely in a vertical plane. These vertical vibrations are continuous, having loops and nodes throughout the conductor span. The loop length, frequency, and amplitude of the vibrations vary over a wide range in any given span, due to variations in wind velocity and direction. The detrimental effects of these vibrations, such as causing fatigue failure of the cable at its points of support, have created a demand for devices capable of reducing or eliminating the vibration. To be effective for this purpose, the dampers or other devices employed must be capable of absorbing energy from the transmission line through a broad range of vibration frequencies. It has been found that while dampers of the Stockbridge type, for example, are effective for certain ranges of frequency, their effectiveness is somewhat decreased during periods of vibration at certain other frequencies.

An object of this invention is to provide a vibration damper which is effective over a broader range of vibration frequencies than previous dampers. Another object is the provision of a vibration damper in which the resilient member is protected from corrosion due to corona discharge or the action of the weather. Other objects will be apparent from the following description and the accompanying drawing, in which:

Fig. 1 is a somewhat diagrammatic elevational view showing a section of a transmission line to which is attached a plurality of vibration dampers;

Fig. 2 is a view, partly in elevation and partly in vertical section, of one embodiment of our invention in operative position;

Fig. 3 is a vertical sectional view of a modified form of one part of the device shown in Fig. 2; and Fig. 4 is a view taken along line IV—IV of Fig. 2.

Referring to the drawing, in which like reference numerals are used throughout to designate like parts, a transmission line 1 is suspended from a suitably insulated support, such as the suspension clamp 2. Attached to the transmission line by means of clamps 3 are any suitable number of vibration dampers 5. The exact construction of the clamps 3 is immaterial, but the form shown has been found to be convenient. This clamp consists of a clamp body 6 and a slidable arm 7 having faces suitably curved or grooved to firmly engage the cable 1, and a lower portion 9 adapted to engage a resilient member 10. The resilient member 10 may be of any convenient form and material, but it is preferably made of stranded galvanized steel cable or the like, and is rigidly fixed in the clamp 3.

Weights or inertia members 11 are rigidly fixed to the ends of the resilient member 10 in any suitable manner. In their preferred form illustrated in the drawing, these weights are substantially cup-shaped, each being cylindrical externally and provided at one end with a longitudinal recess 13 surrounded by a skirt or skirt portion 14, and are preferably rounded at the edges to eliminate sharp corners. The other end or base of each inertia member is substantially solid, but is provided with an aperture or passage 16 which is preferably smaller in diameter than the recess 13 and communicates therewith. The recess preferably tapers towards its inner end, as shown in Figs. 2 and 3, and this taper may continue until the recess is of substantially the same diameter as the resilient member 10 or the aperture 16 in the base of the inertia member, or the end wall of the recess may be substantially perpendicular to the walls of the aperture, as shown in Fig. 3. In any event, the recess may properly be considered as terminating where it meets the aperture 16 in the base of the inertia member, or where it meets the base itself if no aperture is provided, and this point is preferably in or near the transverse plane through the center of gravity of the inertia member.

The inertia members are attached to the ends of the resilient rod or member 10 in any desired manner. For example, the resilient member may extend through the recess 13 into the aperture 16, which is shaped substantially as shown in Fig. 2 and filled with molten zinc 18 or other suitable low-melting metal. The metal is then solidified, thereby securing the weight to the resilient member. Instead of this mode of attachment, the aperture 16 may taper outwardly as shown in Fig. 3, and a radially slitted collet 19, which is preferably adapted to assume a complementary taper, is inserted therein and secures the inertia member to the resilient member as described in more detail and claimed in a copending application Serial No. 663,736 filed March 31, 1933.

One aspect of our invention comprises the provision of a weight or inertia member in which the mass of the member is distributed about its center of gravity in such a manner that its point of attachment, or effective attachment, to the resilient member is substantially at the center of gravity of the weight. In a weight having the form illustrated in Fig. 2, effective attachment to the resilient member is made at the point where the recess 13 is so reduced in size that it, or the aperture 16 which it intersects, engages the cable 10. In a weight shaped and attached to the resilient member as shown in Fig. 3, the point of effective attachment lies between the small end of the tapered collet 19 and the bottom of the recess 13 or the inner end of the aperture 16. The portion of the tapered collet extending into the recess 13 provides a resilient support for the portion of the cable enclosed thereby, so that the point of effective attachment is not at the end of the collet, nor is it at the end of the aperture 16 as before. In both cases, however, the weight is so designed that its point of effective attachment is substantially in the plane of its center of gravity.

The effect of resiliently supported weights in damping the vibration of transmission lines and the like is largely dependent on the absorption of the energy of the vibrating line by work done in flexing the resilient supporting member. It has been found that previous dampers, in which the weights were not attached to the resilient member at their respective centers of gravity, have periods of resonance such that they are not entirely effective over certain ranges of vibration frequency. It is believed that this is because such dampers do not absorb sufficient energy from a transmission line vibrating at frequencies within these ranges. In our improved vibration damper, however, each weight or inertia member preferably has its mass distributed about its point of attachment to the resilient member, so that the weight itself is more easily oscillated with respect to the resilient member. Theoretically, this should increase the energy absorbed by flexing the resilient member at its point of attachment to the inertia member, and it should follow that the total energy absorbed by the resilient member would therefore be increased. Whether or not this theory is correct, the fact remains that it has been found that more effective damping of transmission line vibrations by a damper of any given weight is accomplished when the damper is designed in accordance with our present invention. It has also been found that our improved vibration damper is effective over a wider range of vibration frequencies than dampers of previously known types.

Instead of the preferred cylindrical weights with round corners described hereinabove, suitably recessed weights of other shapes, such as bifurcated rectangular blocks, may be used with a partial attainment of the objects of this invention if so designed that their respective points of effective attachment to the resilient supporting member coincide with or are substantially in the plane of their respective centers of gravity. It is preferable, however, to employ recessed cylindrical weights of the form shown and described hereinabove, as such weights have additional advantages in that they furnish substantial protection to the resilient member from corrosion due to corona discharge, and from the action of the weather. Also, their curved surfaces reduce the amount of corona discharge from the damper itself when attached to a high tension transmission line, as compared with the discharge from more angular weights similarly employed. A further advantage is that the skirt portion of the weight, which shields a large portion of the resilient member as previously described, also comes into contact with the resilient member when conditions are such that violent motion is induced, and thereby limits the motion of the inertia member. It is obvious that these advantages of our preferred form of weight or inertia member are at least partially attained irrespective of the relation of the center of gravity of the member to its point of attachment.

While we have described and illustrated our invention with special reference to embodiments thereof which are now preferred, it is to be understood that these embodiments may be variously modified and that the invention may be otherwise embodied within the scope of the appended claims without departing from the spirit thereof.

We claim:

1. In a vibration damper for transmission lines and the like, a resilient supporting member adapted to extend substantially parallel with said transmission line when in use, means adapted to support said resilient member in the desired position with respect to said transmission line, and at least one inertia member having substantially non-angular external surfaces and a substantially cylindrical skirt defining a recess open at one end and a base integral with said skirt, said resilient member extending through said recess and being connected to said base, whereby the inertia member is supported in the desired position and the resilient member is shielded by said skirt.

2. In a vibration damper for transmission lines and the like, a clamp adapted for attachment to a transmission line, a resilient supporting member engaged by said clamp and held thereby spaced from but substantially parallel with said transmission line when in use, and at least one inertia member having a substantially cylindrical skirt defining a recess open at one end and having a substantially solid portion at the other end of the recess integral with the skirt and provided with a relatively small aperture communicating with said recess, said resilient member extending through said recess and secured within said aperture and being normally out of contact with said skirt but shielded thereby.

3. In a vibration damper, an inertia member having a substantially solid portion at one end and an integral substantially cylindrical skirt surrounding a recess closed at one end by said solid portion, and a resilient supporting member extending into said recess and attached to said inertia member, the point of effective attachment being substantially in the transverse plane of the center of gravity of the inertia member.

4. In a vibration damper, a recessed inertia member having a substantially solid portion at one end of the recess, and a resilient supporting member extending through said recess and attached to said substantially solid portion of the inertia member, the point of effective attachment being substantially in the transverse plane of the center of gravity of the inertia member.

5. In a vibration damper, an inertia member having one end longitudinally recessed, the other end being substantially solid and the center of gravity of the member being in the transverse plane of the inner end of the recess.

6. A vibration damper for electrical transmission lines and the like, comprising a pair of inertia members securely attached to the ends of a resilient supporting member, the points of effective attachment being substantially in the transverse planes of the respective centers of gravity of the inertia members, and a clamping member engaging the resilient member intermediate its ends and adapted to engage a transmission line.

7. A vibration damper for transmission lines and the like, comprising a pair of inertia members each having a longitudinal recess and a substantially solid portion at one end of the recess, and a resilient member engaged substantially centrally by a clamp adapted to also engage a transmission line, the ends of said resilient member being attached to said inertia members and portions of said resilient member between the clamp and the attached ends being disposed in said recesses, and the points of effective attachment of the inertia members to the resilient member being substantially in the planes of the respective centers of gravity of the inertia members.

8. A vibration damper for transmission lines and the like, comprising a resilient supporting member, a clamping member engaging said supporting member intermediate its ends and adapted to engage a transmission line, and a pair of like inertia members, each having a substantially cylindrical skirt portion defining a recess and a substantially solid end portion integral with the skirt portion and provided with a relatively small aperture communicating with said recess, the ends of the resilient member being attached to the inertia members and extending into the apertures therein, and the points of effective attachment being substantially in the planes of the respective centers of gravity of the inertia members.

MAXWELL E. NOYES.
ROBERT A. MONROE.